United States Patent
Kim et al.

(10) Patent No.: US 10,896,126 B2
(45) Date of Patent: Jan. 19, 2021

(54) STORAGE DEVICE, METHOD AND NON-VOLATILE MEMORY DEVICE PERFORMING GARBAGE COLLECTION USING ESTIMATED NUMBER OF VALID PAGES

(71) Applicant: SAMSUNG ELECTRONICS CO., LTD., Suwon-si (KR)

(72) Inventors: Byeong-Hui Kim, Hwaseong-si (KR); Jung-Min Seo, Seongnam-si (KR); Hyeon-Gyu Min, Seoul (KR); Seung-Jun Yang, Hwaseong-si (KR); Joo-Young Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/445,491

(22) Filed: Jun. 19, 2019

(65) Prior Publication Data

US 2020/0133845 A1    Apr. 30, 2020

(30) Foreign Application Priority Data

Oct. 25, 2018  (KR) .................. 10-2018-0128313

(51) Int. Cl.
*G06N 3/08*    (2006.01)
*G06F 12/121*  (2016.01)
*G06F 12/02*   (2006.01)

(52) U.S. Cl.
CPC ........ *G06F 12/0253* (2013.01); *G06F 12/121* (2013.01); *G06N 3/08* (2013.01); *G06F 2212/1044* (2013.01)

(58) Field of Classification Search
CPC .............. G06F 12/0253; G06F 12/121; G06F 2212/1044; G06F 2212/1036;
(Continued)

(56) References Cited

U.S. PATENT DOCUMENTS 7,409,489 B2 *  8/2008  Sinclair ................. G06F 3/0605
                                                    711/103
7,984,084 B2 *  7/2011  Sinclair ................... G06F 3/064
                                                     707/818
(Continued)

OTHER PUBLICATIONS

Webopedia, "neural network", Aug. 5, 2007, pp. 1-3, https://web.archive.org/web/20070805212355/https://www.webopedia.com/TERM/N/neural_network.html (Year: 2007).*
(Continued)

*Primary Examiner* — Christopher D Birkhimer
(74) *Attorney, Agent, or Firm* — Volentine, Whitt & Francos, PLLC

(57) ABSTRACT

Garbage collection is performed according to an estimated number of valid pages. A storage device estimates a valid page count at a future time based on a valid page count at each of past time steps and a present time step using a neural network model and selects a victim block that undergoes the garbage collection from memory blocks based on an estimated valid page count. A memory block having a lowest estimated valid page count or having an estimated valid page count having a maintaining tendency is selected as the victim block or a memory block having the estimated valid page count having a decreasing tendency is excluded from selecting the victim block.

20 Claims, 17 Drawing Sheets

(58) Field of Classification Search
CPC ..... G06F 2212/7205; G06F 2212/7211; G06F 12/0246; G06N 3/08
See application file for complete search history.

(56) References Cited

U.S. PATENT DOCUMENTS

| | | | |
|---|---|---|---|
| 8,799,561 B2* | 8/2014 | Bux | G06F 12/0261 711/103 |
| 8,949,515 B2* | 2/2015 | Nishi | G06F 12/0246 711/103 |
| 9,015,387 B2 | 4/2015 | Byun | |
| 9,053,019 B2* | 6/2015 | Roh | G06F 12/023 |
| 9,298,608 B2* | 3/2016 | Fitzpatrick | G06F 12/0246 |
| 9,971,681 B2 | 5/2018 | Zhang et al. | |
| 2005/0119834 A1* | 6/2005 | Kita | G16C 20/50 702/19 |
| 2007/0033324 A1* | 2/2007 | Sinclair | G06F 3/0608 711/103 |
| 2007/0033325 A1* | 2/2007 | Sinclair | G06F 3/0608 711/103 |
| 2012/0246399 A1* | 9/2012 | Nishi | G06F 12/0246 711/103 |
| 2013/0080689 A1* | 3/2013 | Jo | G06F 12/0246 711/103 |
| 2013/0132647 A1 | 5/2013 | Melik-Martirosian | |
| 2014/0032817 A1* | 1/2014 | Bux | G06F 12/0261 711/103 |
| 2015/0113206 A1* | 4/2015 | Fitzpatrick | G11C 16/3495 711/103 |
| 2015/0324691 A1 | 11/2015 | Dropps et al. | |
| 2016/0147652 A1* | 5/2016 | Miyaji | G06F 12/0253 711/103 |
| 2016/0179386 A1 | 6/2016 | Zhang | |
| 2016/0267004 A1 | 9/2016 | Perlstein et al. | |
| 2016/0364177 A1 | 12/2016 | Anderson | |
| 2017/0300410 A1 | 10/2017 | Zhang et al. | |
| 2017/0344307 A1 | 11/2017 | Shahidi et al. | |
| 2018/0018091 A1 | 1/2018 | Shin et al. | |
| 2018/0143762 A1 | 5/2018 | Kim et al. | |
| 2018/0276113 A1* | 9/2018 | Navon | G06F 3/0631 |
| 2018/0276116 A1* | 9/2018 | Hahn | G06F 3/0659 |

OTHER PUBLICATIONS

Webopedia, "garbage collection", Dec. 20, 2009, pp. 1-2, https://web.archive.org/web/20091220052543/https://www.webopedia.com/TERM/G/garbage_collection.html (Year: 2009).*

EPO Office Action dated Dec. 17, 2019 Corresponding to Application No. EP19177962.8.

Mendel Rosenblum et al., "The Design and Implementation of a Log-Structured File System", ACM Transactions on Computer Systems, vol. 10, No. 1, Feb. 1992, pp. 26-52.

* cited by examiner

FIG. 7A

| NO. | INFORMATION OF MODEL INPUT FEATURE MANAGER MODULE |
|---|---|
| 1 | VPC/BLOCK |
| 2 | AVERAGE READ IOPS |
| 3 | AVERAGE WRITE IOPS |
| 4 | AVERAGE READ IO SIZE |
| 5 | AVERAGE WRITE IO SIZE |
| 6 | READ THROUGHPUT |
| 7 | WRITE THROUGHPUT |
| 8 | FREE BLOCK COUNT |

FIG. 7B

STEP t-2

| BN | VPC |
|---|---|
| 1 | 2000 |
| 2 | 1300 |
| 3 | 5000 |
| 4 | 3000 |
| 5 | 600 |
| ... | ... |

STEP t-1

| BN | VPC |
|---|---|
| 1 | 1500 |
| 2 | 1400 |
| 3 | 5000 |
| 4 | 3000 |
| 5 | 600 |
| ... | ... |

STEP t

| BN | VPC |
|---|---|
| 1 | 1000 |
| 2 | 1500 |
| 3 | 5000 |
| 4 | 3000 |
| 5 | 8000 |
| ... | ... |

BN : BLOCK NUMBER
VPC : VALID PAGE COUNT

STORAGE DEVICE, METHOD AND NON-VOLATILE MEMORY DEVICE PERFORMING GARBAGE COLLECTION USING ESTIMATED NUMBER OF VALID PAGES

CROSS-REFERENCE TO RELATED APPLICATION

This application claims the benefit of Korean Patent Application No. 10-2018-0128313, filed on Oct. 25, 2018, in the Korean Intellectual Property Office, the subject matter of which is hereby incorporated by reference.

BACKGROUND

The inventive concept relates to electronic devices, and more particularly, to configurations and operations of data storage devices.

In their great variety and broad proliferation, contemporary electronic devices provide many different functions and capabilities. These electronic devices include various electrical circuits, where individual electrical circuits performs one or more specific function(s) while communicating with other electronic circuits.

Electronic devices capable of receiving, storing and providing data (hereafter, "storage devices") are common components of many contemporary products. Storage devices may be implemented in a variety of volatile and/or non-volatile types.

Flash memory is one type of non-volatile storage device in which stored data is retained even in the absence of applied power. Storage devices using flash memory (hereafter, "flash memory devices") usually write (or program) data in page units, but erase data in block units. When writing data to previously programmed memory cells, flash memory devices erase the memory cells before writing new data. In order to efficiently enable writing, reading and erasing operations in view as certain physical characteristics, flash memory devices used one or more memory block management approaches and corresponding hardware, firmware and/or software.

For example, a memory controller may be used within a flash memory device to performs garbage collection operations in order to allocated or reallocate memory space (e.g., a so-called "free block"). In certain embodiments, garbage collection is an operation used to obtain one or more free block(s) by reading valid data from one or more "victim block(s)", moving (or copying) the read data to one or more "destination block(s)", and erasing the victim block(s). However, it can take a considerable amount of time to perform conventional garbage collection operations, and as the number and/or size of victim block(s) increases, the overall efficiency of garbage collection operations decreases. Lagging garbage collection operation tend to degrade the overall performance of flash memory devices.

SUMMARY

The inventive concept provides a storage device, method and non-volatile memory device, which are for efficiently performing garbage collection using the estimated number of valid pages.

According to an aspect of the inventive concept, there is provided a method of operating a storage device which includes a non-volatile memory device and a memory controller controlling the non-volatile memory device. The method includes estimating a valid page count of each of memory blocks using a neural network model trained based on the valid page count of each of the memory blocks, the memory blocks storing data in the non-volatile memory device; selecting a victim block from the memory blocks based on an estimated valid page count of each of the memory blocks, the victim block undergoing garbage collection; and performing the garbage collection on the victim block.

According to another aspect of the inventive concept, there is provided a storage device including a non-volatile memory device including memory blocks storing data; and a memory controller configured to estimate a valid page count of each of the memory blocks using a neural network model and to select a victim block from the memory blocks based on an estimated valid page count of each of the memory blocks, the neural network model being trained based on the valid page count of each of the memory blocks, and the victim block undergoing garbage collection.

According to a further aspect of the inventive concept, there is provided a non-volatile memory device including a memory cell array including memory blocks storing data; and a control logic block configured to control garbage collection to be performed on a victim block, the victim block being selected from the memory blocks based on estimated valid page counts provided from a neural network model trained based on valid page counts of the memory blocks.

BRIEF DESCRIPTION OF THE DRAWINGS

Embodiments of the inventive concept will be more clearly understood from the following detailed description taken in conjunction with the accompanying drawings in which:

FIGS. 7A and 7B are diagrams showing information collected in a model input feature manager module in FIG. 6;

DETAILED DESCRIPTION

Figure 1:
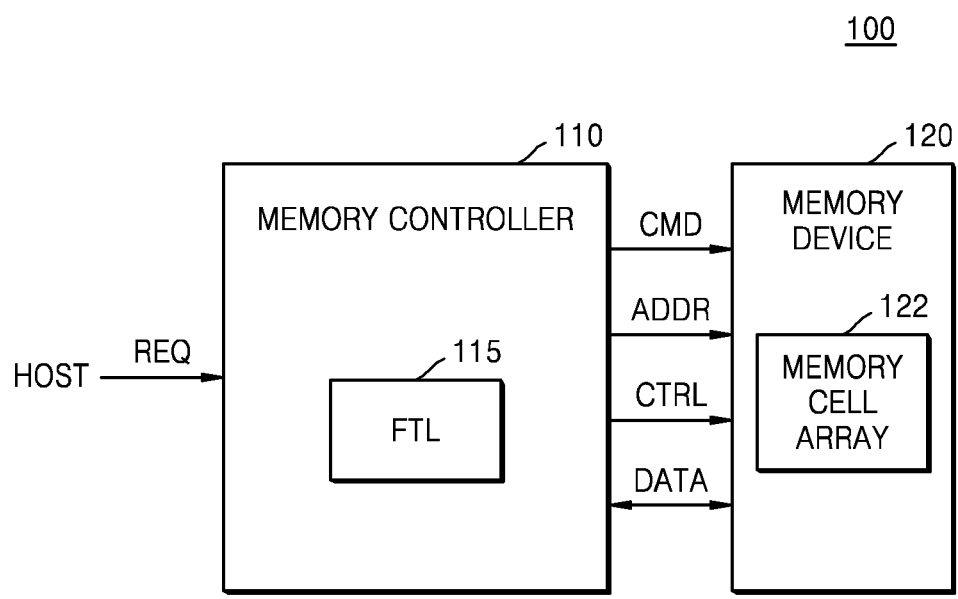
FIG. 1 is a block diagram of a memory system included in a storage device according to an embodiment of the inventive concept.

Figure (FIG. 1 is a general block diagram of a memory system 100 including a memory controller 110 and a memory device 120. The memory device 120 may be a non-volatile storage device, such as a flash memory device. Alternatively, the memory device 120 may be a resistive storage device, such as a resistive random access memory (ReRAM), a magnetic RAM (MRAM), or a phase-change RAM (PRAM). In the embodiments described hereafter, it is assumed that the memory device 120 is a flash memory device including NAND or NOR flash memory cells.

The memory controller 110 and memory device 120 may be integrated into a single semiconductor device. In some embodiments, the memory system 100 may be implemented as internal memory embedded in a storage device and may include, for example, an embedded universal flash storage (UFS) memory device, an embedded multi-media card (eMMC), or a solid state drive (SSD). In some embodiments, the memory system 100 may be implemented as external memory removably installed in a storage device and may include, for example, a UFS memory card, compact flash (CF), secure digital (SD), micro-SD, mini-SD, extreme digital (xD), or a memory stick.

The memory controller 110 may be used to read data from the memory device 120 in response to a read data request REQ from a host (not shown). The memory controller 110 may also be used to program (or write) data to the memory device 120 in response to a write data request REQ from the host. That is, the memory controller 110 may be variously used to control the execution of a program (or write) operation, a read operation, and/or an erase operation with respect to the memory device 120 by providing an appropriate command(s) CMD, address(es) ADDR, and/or control signal(s) CTRL to the memory device 120. In addition, data to be written DATA and/or read data DATA may be received/transmitted between the memory controller 110 and the memory device 120.

In certain embodiments wherein the memory device 120 is a flash memory device, the memory controller 110 may include a flash translation layer (FTL) 115. The FTL 115 may include system software (or firmware) for managing the program, read, and erase operations of the memory device 120. The FTL 115 may be loaded to a working memory 220 (FIG. 2) of the memory controller 110 upon power-up of the memory system 100. The firmware included in the FTL 115 may be run by a processing unit 210 (in FIG. 2) in the memory controller 110.

The FTL 115 may be used to translate a logical address— e.g., a logical address associated with a data access request REQ received from the host—into a corresponding physical address. This physical address may then be provided to the memory device 120. In addition, the FTL 115 may be used (or referenced) during certain memory management operations. Memory system management operations may be performed according to designated memory cell regions (e.g., a chip, a block, and/or a page) for the memory device 120. For example, the FTL 115 may perform garbage collection and/or bad block management on blocks of a memory cell array 122 included in the memory device 120.

For purposes of this description, the memory cell array 122 is assumed to include a vast plurality of NAND type, flash memory cells. The memory cell array 122 may implemented in certain embodiments as a three-dimensional (3D) memory cell array including memory cells arranged in a plurality of NAND strings. Such examples will be described in some additional detail hereafter with reference to FIGS. 4 and 5.

A 3D memory cell array may be monolithically formed at at least one physical level of memory cell arrays, which have an active region arranged on a silicon substrate and a circuit formed on or in the substrate, the circuit being involved in the operation of memory cells. The term "monolithic" means that layers of each level of an array are directly stacked on layers of an underlying level of the array. In some embodiments, the 3D memory cell array includes NAND strings which are arranged in a vertical direction such that at least one memory cell is positioned on another memory cell. The at least one memory cell may include a charge trap layer. U.S. Pat. Nos. 7,679,133; 8,553,466; 8,654,587; and 8,559,235, as well as published U.S. Patent Application No. 2011/0233648 disclose exemplary structures of 3D memory arrays in which the 3D memory array includes a plurality of levels and word lines and/or bit lines are shared according to levels. The subject matter of these documents is incorporated herein by reference.

Figure 2:
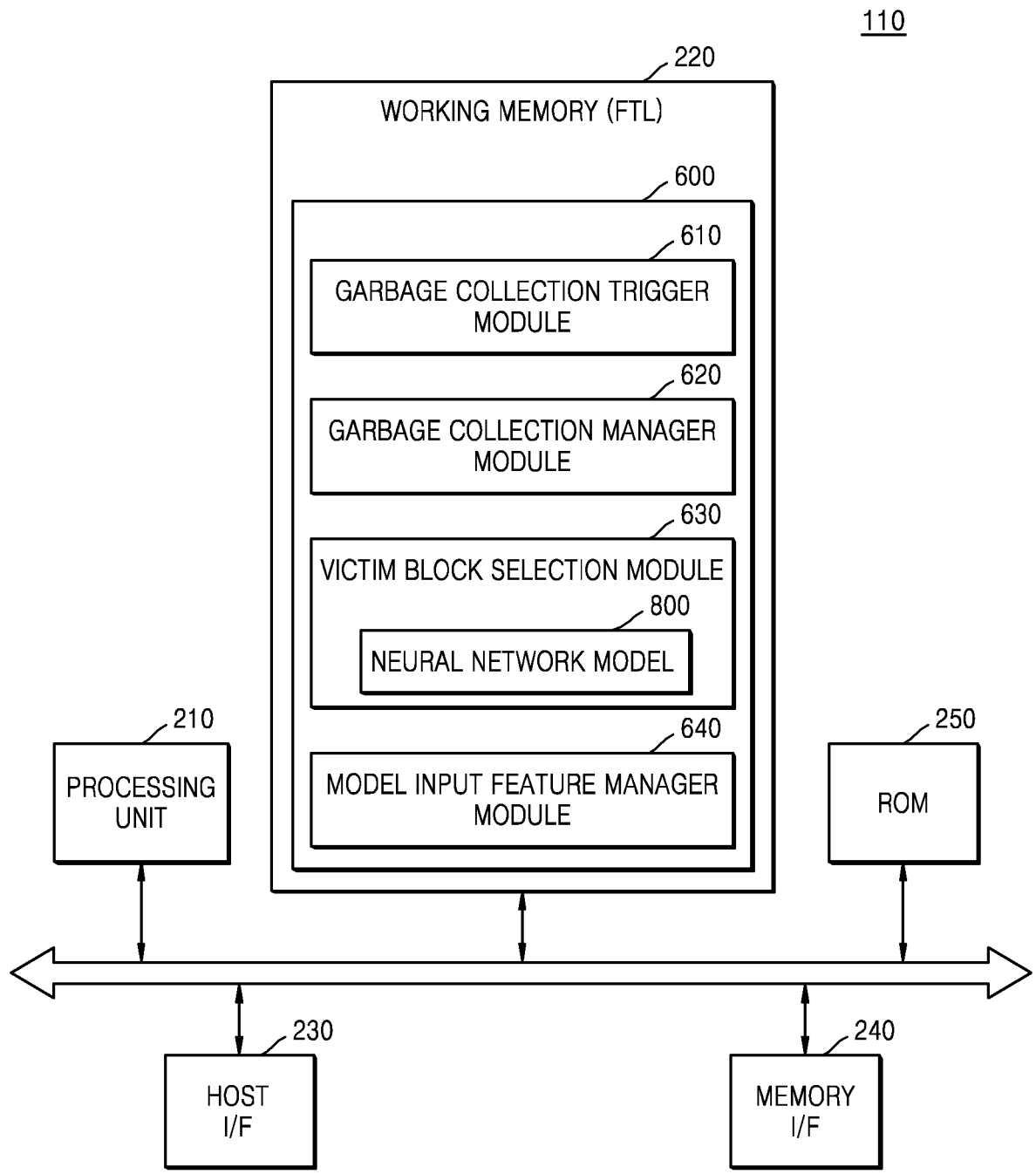
FIG. 2 is a block diagram of a memory controller in FIG. 1.

FIG. 2 is a block diagram further illustrating in one example the memory controller 110 of FIG. 1. Here, the memory controller 110 includes the processing unit 210, the working memory 220, a host interface (I/F) 230, a memory I/F 240, and read-only memory (ROM) 250. The processing unit 210 may include a central processing unit (CPU) or a microprocessor and may control all operations of the memory controller 110. The processing unit 210 may run the firmware loaded to the working memory 220 to control the memory controller 110.

The memory controller 110 may communicate with an external host through various standard interfaces. The host I/F 230 provides an interface between the host and the memory controller 110. The standard interfaces may include advanced technology attachment (ATA), serial ATA (SATA), external SATA (e-SATA), small computer system interface (SCSI), serial attached SCSI (SAS), peripheral component interconnect (PCI), PCI express (PCI-E), Institute of Electrical and Electronics Engineers (IEEE) 1394, universal serial bus (USB), SD card interface, MMC interface, eMMC interface, UFS interface, CF card interface, etc.

The memory I/F 240 provides a functional interface with the memory device 120. For example, write data and read data may be transmitted and received to and from the memory device 120 via the memory interface 240. The memory interface 240 may provide the command CMD, the address ADDR, and/or the control signal CTRL to the memory device 120 and receive in return various kinds of data from the memory device 120. Such data may then be provided to other components of the memory controller 110.

The ROM 250 may be used to store code data, which is necessary for initial booting of a storage device employing the memory system 100. The working memory 220 may be implemented using various types of memory. For example, the working memory 220 may include at least one of cache memory, dynamic RAM (DRAM), static RAM (SRAM), PRAM, and flash memory devices.

The memory controller 110 may further include various components not shown in FIG. 2. For example, the memory controller 110 may further include a buffer memory for temporarily storing data during write/read operation(s), a buffer control module controlling the buffer memory, a command generation module generating a command for controlling memory operation in response to a data access request from a host, a command queue storing a plurality of commands, etc.

Units in which the host manages data may vary from the unit(s) in which the memory device 120 manages data. For example, while the host may write and read data on a sector by sector basis, the memory device 120 may write and read data on a page by page basis, where a page may be greater in its size than a sector. During a write operation, therefore, the buffer control module may group sectors of data received from the host into a page of data, such that page data may be efficiently written to the memory device 120.

The FTL 115 described above with reference to FIG. 1 may be loaded to the working memory 220. As firmware performing garbage collection, the FTL 115 may include a garbage collection module 600 that may be used to obtain (or secure) a free block by copying valid page data from a victim block to a destination block, and then erasing the victim block to create a free block. In certain embodiments, the garbage collection module 600 may include a garbage collection trigger module 610, a garbage collection manager module 620, a victim block selection module 630, and a model input feature manager module 640 in accordance with various functions implemented by the firmware. One example of the garbage collection module 600 will be described in some additional detail hereafter with reference to FIG. 6.

The memory controller 110 may be used to control garbage collection of the memory device 120 using the garbage collection module 600. For example, the memory controller 110 may estimate the number of valid pages in first through n-th memory blocks BLK1 through BLKn (in FIG. 3) using a neural network model 800, which has been trained (e.g.,) using the numbers of valid pages in the first through n-th memory blocks BLK1 through BLKn. Here, the first through n-th memory blocks BLK1 through BLKn are included in the memory device 120.

The memory controller 110 may select a victim block to undergo garbage collection from the first through n-th memory blocks BLK1 through BLKn based on the estimated number of valid pages in each of the first through n-th memory blocks BLK1 through BLKn. For example, the memory controller 110 may select, as a victim block, a memory block having a lowest estimated number of valid pages among the first through n-th memory blocks BLK1 through BLKn. When selecting a victim block, the memory controller 110 may exclude a memory block having an estimated number of valid pages that tends to decrease among the first through n-th memory blocks BLK1 through BLKn. The memory controller 110 may select, as a victim block, a memory block having the estimated number of valid pages which is maintained among the first through n-th memory blocks BLK1 through BLKn.

The memory controller 110 may control garbage collection in such a manner that data of valid pages in the selected victim block are copied to a destination block and the victim block is erased.

Figure 3:
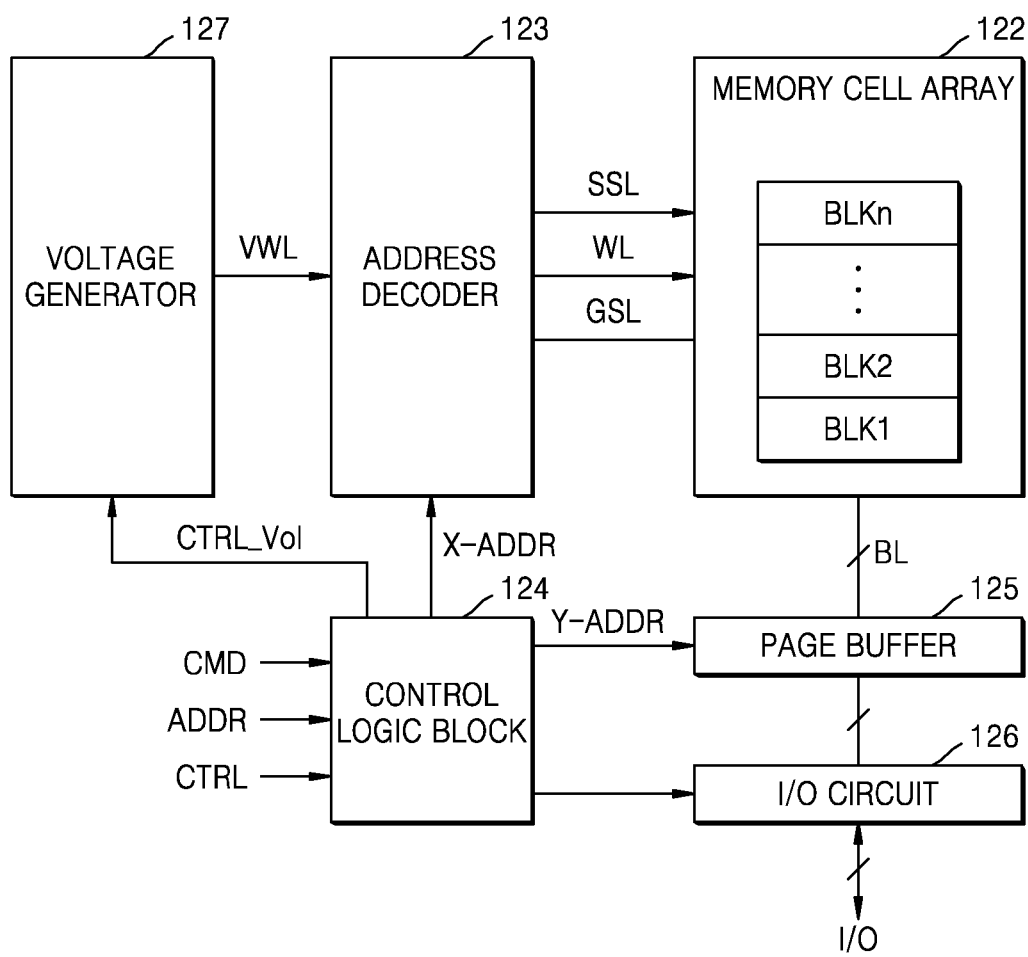
FIG. 3 is a block diagram of a memory device in FIG. 1.

FIG. 3 is a block diagram further illustrating in one example the memory device 120 of FIG. 1. Referring to FIG. 3, the memory device 120 may include the memory cell array 122, an address decoder 123, a control logic block 124, a page buffer 125, an input/output (I/O) circuit 126, and a voltage generator 127. Although not shown, the memory device 120 may further include an I/O interface.

The memory cell array 122 may be connected to word lines WL, string selection lines SSL, ground selection lines GSL, and bit lines BL. The memory cell array 122 may be connected to the address decoder 123 via the word lines WL, the string selection lines SSL, and the ground selection lines GSL and to the page buffer 125 via the bit lines BL. The memory cell array 122 may include the first through n-th memory blocks BLK1 through BLKn.

Each of the first through n-th memory blocks BLK1 through BLKn may include a plurality of memory cells and a plurality of selection transistors. The memory cells may be connected to the word lines WL and the selection transistors may be connected to the string selection lines SSL or the ground selection lines GSL. The memory cells in each of the first through n-th memory blocks BLK1 through BLKn may include single level cells storing 1-bit data or multi-level cells storing M-bit data, where M is an greater than 1.

The address decoder 123 may select one of the first through n-th memory blocks BLK1 through BLKn of the memory cell array 122, select one of word lines WL of the selected memory block, and select one of the string selection lines SSL.

The control logic block 124 may output various control signals for performing program, read, and erase operations on the memory cell array 122 based on the command CMD, the address ADDR, and the control signal CTRL. The control logic block 124 may provide a row address X-ADDR to the address decoder 123, a column address Y-ADDR to the page buffer 125, and a voltage control signal CTRL_Vol to the voltage generator 127.

The control logic block 124 may perform garbage collection on a victim block which is selected from the first through n-th memory blocks BLK1 through BLKn based on the number of valid pages in each of the first through n-th memory blocks BLK1 through BLKn, the number of valid pages being estimated by the neural network model 800 of the memory controller 110.

When the memory controller 110 selects, as a victim block, a memory block having the lowest estimated number of valid pages among the first through n-th memory blocks BLK1 through BLKn, the control logic block 124 may perform garbage collection by copying data of the valid pages in the victim block to a destination block and erasing the victim block.

When the memory controller 110 selects a memory block, which has been excluded from a victim block selection before and has the estimated number of valid pages which tends to decrease among the first through n-th memory blocks BLK1 through BLKn, as a victim block because the number of valid pages in the memory block is 0, the control logic block 124 may perform garbage collection by erasing the victim block.

When the memory controller 110 selects, as a victim block, a memory block having the estimated number of valid pages which is maintained among the first through n-th memory blocks BLK1 through BLKn, the control logic block 124 may perform garbage collection by copying data of the valid pages in the victim block to a destination block and erasing the victim block.

The page buffer 125 may operate as a write driver or a sense amplifier according to an operating mode. In a read operation, the page buffer 125 may sense a bit line BL of a selected memory cell under the control of the control logic block 124. Sensed data may be stored in latches included in the page buffer 125. The page buffer 125 may dump data stored in the latches to the I/O circuit 126 under the control of the control logic block 124.

The I/O circuit 126 may temporarily store the command CMD, the address ADDR, the control signal CTRL, and the data DATA, which are received from outside the memory device 120 via an I/O line I/O. The I/O circuit 126 may temporarily store read data of the memory device 120 and output the read data via the I/O line I/O at a predefined time point.

The voltage generator 127 may generate various voltages for performing program, read, and erase operations on the memory cell array 122 based on the voltage control signal CTRL_Vol. That is, the voltage generator 127 may generate a word line voltage VWL, e.g., a program voltage, a read voltage, a pass voltage, an erase verify voltage, or a program verify voltage. The voltage generator 127 may also generate a string selection line voltage and a ground selection line voltage based on the voltage control signal CTRL_Vol. In addition, the voltage generator 127 may generate an erase voltage to be provided to the memory cell array 122.

Figure 4:
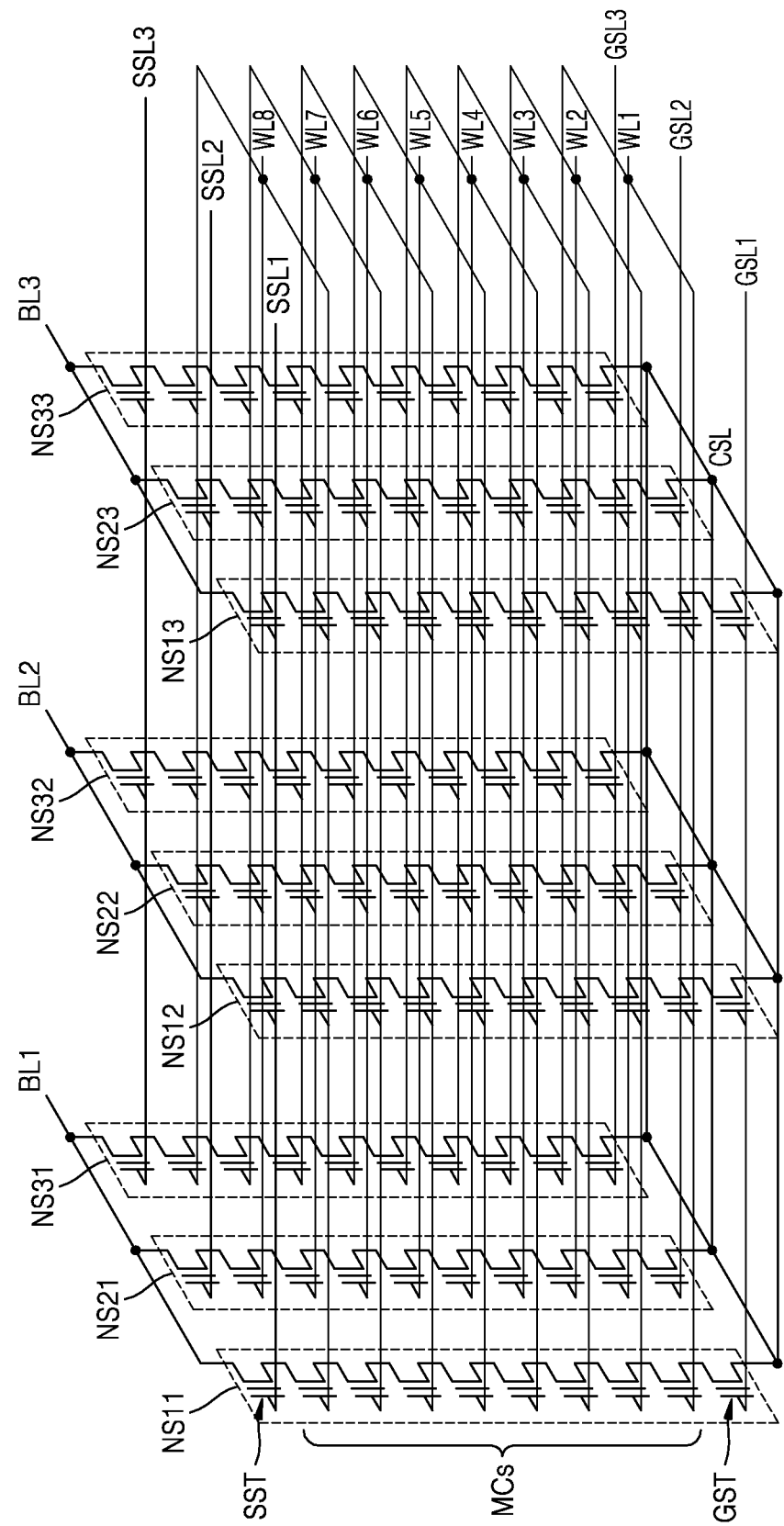
FIG. 4 is an equivalent circuit diagram of a first memory block in FIG. 3.

FIG. 4 is an equivalent circuit diagram of the first memory block BLK1 shown in FIG. 3. Referring to FIG. 4, the first memory block BLK1 may include NAND strings NS11 through NS33, word lines WL1 through WL8, bit lines BL1 through BL3, ground selection lines GSL1 through GSL3, first through third string selection lines SSL1 through SSL3, and a common source line CSL. Each NAND string (e.g., NS11) may include a string selection transistor SST, a plurality of memory cells MC, and a ground selection transistor GST, which are connected in series. The string selection transistor SST is connected to the first string selection line SSL1 corresponding thereto. The ground selection transistor GST is connected to the ground selection line GSL1 corresponding thereto. The string selection transistor SST is connected to the bit line BL1 corresponding thereto. The ground selection transistor GST is connected to the common source line CSL.

Among the NAND strings NS11 through NS33, the NAND strings NS11, NS12, and NS13 in a first row are connected in common to the first string selection line SSL1 and may construct a first plane. The NAND strings NS21, NS22, and NS23 in a second row are connected in common to the second string selection line SSL2 and may construct a second plane. The NAND strings NS31, NS32, and NS33 in a third row are connected in common to the third string selection line SSL3 and may construct a third plane. In the current embodiment, the first memory block BLK1 shows three planes connected to three bit lines BL1 through BL3.

The memory cells MC are respectively connected to the word lines WL1 through WL8. A group of memory cells MC that are connected to one word line and simultaneously programmed is referred to as a page. The first memory block BLK1 may include a plurality of pages. In an embodiment, a plurality of pages may be connected to a single word line. A word line, e.g., the word line WL4, at a certain height from the common source line CSL may be connected in common to three pages.

Meanwhile, each memory cell MC may store one bit or at least two bits of data. A memory cell capable of storing one bit of data is referred to as a single level cell (SLC) or a single bit cell. A memory cell capable of storing at least two bits of data is referred to as a multi-level cell (MLC). In the case of 2-bit MLCs, two-page data may be stored in a single physical page. For example, six-page data may be stored in memory cells connected to the word line WL4.

The numbers of rows and columns of NAND strings in the first memory block BLK1 may increase or decrease. When the number of rows of NAND strings changes, the number of planes may change. When the number of columns of NAND strings changes, the number of bit lines connected to the columns of NAND strings and the number of NAND strings connected to a single string selection line may change. The height of NAND strings may increase or decrease. For example, the number of memory cells stacked in each NAND string may increase or decrease.

Figure 5:
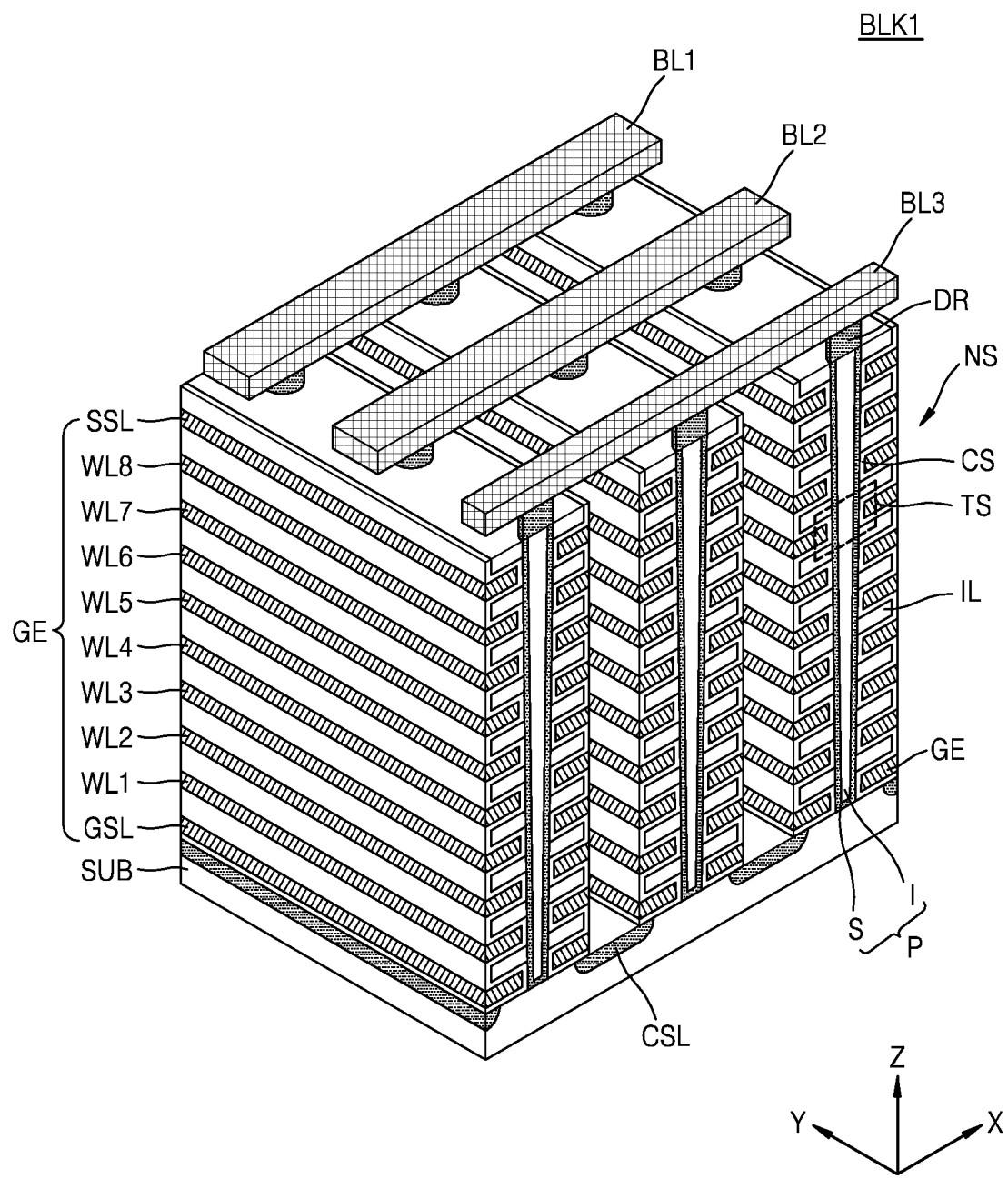
FIG. 5 is an exemplary perspective view of the first memory block in FIG. 3.

FIG. 5 is an exemplary perspective view of the first memory block BLK1 shown in FIG. 3. Referring to FIG. 5, the first memory block BLK1 is vertically formed on a substrate SUB. The substrate SUB has a first conductivity type (e.g., a p-type). A common source line CSL doped with second conductivity type (e.g., n-type) impurities is provided in the substrate SUB to extend in a first direction "y". Insulating layers IL are provided on the substrate SUB between two adjacent common source lines CSL. The insulating layers IL extend in the first direction "y" and are sequentially provided in a third direction "z". The insulating layers IL are a certain distance apart in the third direction "z". Pillars P penetrating through the insulating layers IL in the third direction "z" are sequentially arranged in the first direction "y" on the substrate SUB between two adjacent common source lines CSL. For example, the pillars P may be in contact with the substrate SUB, penetrating through the insulating layers IL. In detail, a surface layer S of each pillar P may include a silicon material having the first conductivity type and may function as a channel region. An inner layer I of each pillar P may include an insulating material such as silicon oxide or an air gap.

A charge storage layer CS is provided along exposed surfaces of the insulating layers IL, the pillars P, and the substrate SUB in a region between two adjacent common source lines CSL. The charge storage layer CS may include a tunneling insulating layer, a charge trap layer, and a blocking insulating layer. Gate electrodes GE, such as selection lines, e.g., GSL and SSL, and the word lines WL1 through WL8, are provided on an exposed surface of the charge storage layer CS in the region between two adjacent common source lines CSL. Drain contacts DR are provided on each of the pillars P. For example, the drain contacts DR may include a silicon material doped with second conductivity type impurities. The bit lines BL1 through BL3 are provided on the drain contacts DR. The bit lines BL1 through BL3 extend in a second direction "x" and are a certain distance apart in the first direction "y".

Figure 6:
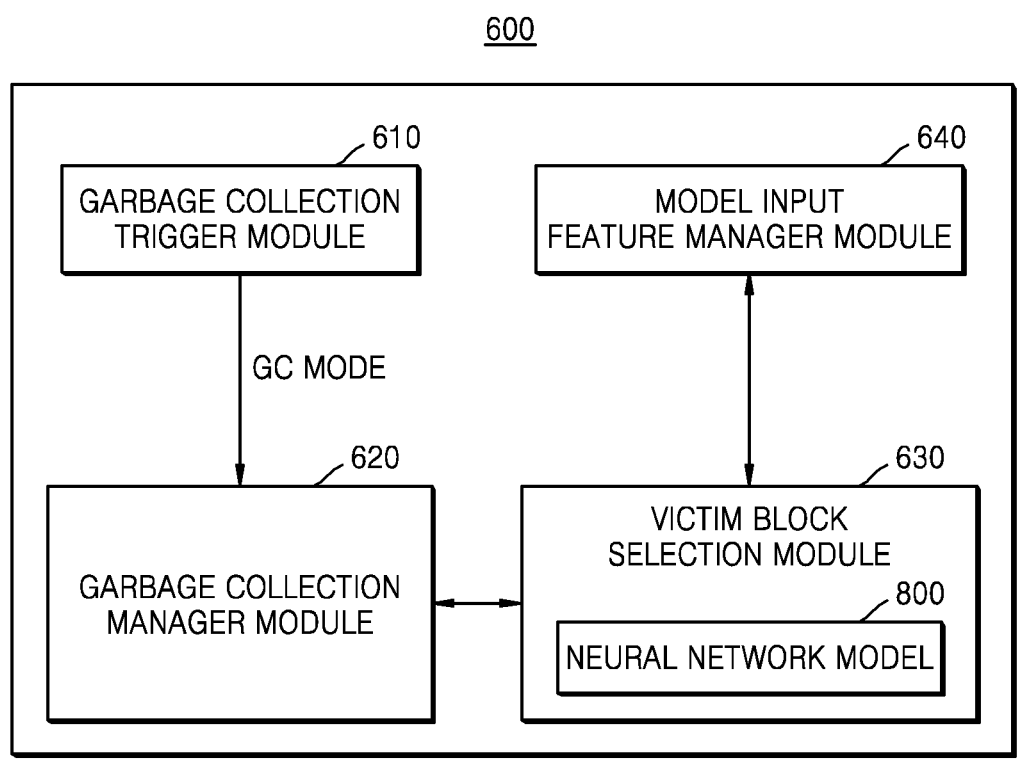
FIG. 6 is a diagram of a garbage collection module in FIG. 2.

FIG. 6 is a block diagram further illustrating in one example the garbage collection module 600 of FIG. 2. Referring to FIG. 6, the garbage collection module 600 may include the garbage collection trigger module 610, the garbage collection manager module 620, the victim block selection module 630, and the model input feature manager module 640.

The garbage collection trigger module 610 may be used to count a number of free blocks among the first through n-th memory blocks BLK1 through BLKn included in the memory cell array 122 (in FIG. 3) of the memory device 120. The garbage collection trigger module 610 may further be used to determine a point in operation of the memory system 100 to secure one or more free block(s) by causing (or triggering) the memory controller 110 to enter a garbage collection mode (hereafter, referred to as "GC mode"). For example, when the number of free blocks falls below a given first garbage collection threshold value (hereinafter, "first GC threshold value"), the garbage collection trigger module 610 may trigger the GC mode using the garbage collection manager module 620.

In certain embodiment, the execution of data access operations (e.g., read, write and/or erase operation(s)) by the memory device 120 may be temporarily interrupted when the memory system 100 enters the GC mode. Hence, the garbage collection trigger module 610 may be used to notify the host via the host I/F 230 that the memory system has entered the GC mode.

In the GC mode, the garbage collection manager module 620 may select at least one victim block to undergo garbage collection. The garbage collection manager module 620 may also be used to select at least one destination block. The garbage collection manager module 620 may copy data of valid pages from the victim block to the destination block and then erase the victim block. The garbage collection manager module 620 may select a memory block that is predicted to have a low garbage collection "cost" (e.g., time and/or required resources) from among the first through n-th memory blocks BLK1 through BLKn provided from the victim block selection module 630.

The garbage collection manager module 620 may select more victim blocks than destination blocks to secure one or more free block(s). For example, three victim blocks and two destination blocks may be selected and data from valid pages may be copied from the three victim blocks to the two destination blocks. The three victim blocks are erased after the valid data of the three victim blocks is copied, and accordingly, at least one block may be secured.

The garbage collection manager module 620 may request a victim block to be selected from the victim block selection module 630 during the GC mode. In response to the request of the garbage collection manager module 620, the victim block selection module 630 may predict a memory block having a low (or lowest) garbage collection cost from among the first through n-th memory blocks BLK1 through BLKn. The victim block selection module 630 may predict a memory block having a low garbage collection cost based on internal information of the memory system 100 (in FIG. 1). Such internal information may be variously derived, but in certain embodiments the internal information will be derived from prior data processing operations performed by the memory system 100, or a component of the memory system 100. For example, the internal information of the memory system 100 may be provided from the model input feature manager module 640.

In certain embodiments, the victim block selection module 630 may use the neural network model 800 to predict a memory block having a low garbage collection cost among the first through n-th memory blocks BLK1 through BLKn. The neural network model 800 may generate a neural network, learn a neural network, perform an operation based on input data and obtain training data based on an operation result, or provide output data corresponding to the training data.

For example, as the input data, a number of valid pages for each one of the first through n-th memory blocks BLK1 through BLKn at each of one of several past time steps (e.g., "t-2" and "t-1", given a present time step of "t") may be input to the neural network model 800. In response, the neural network model 800 may provide an estimated number of valid pages for each of the first through n-th memory blocks BLK1 through BLKn as the output data. One example of the neural network model 800 will be described in some additional detail with reference to FIG. 8.

The victim block selection module 630 may predict a memory block having a low garbage collection cost based on the estimated number of valid pages for each of the first through n-th memory blocks BLK1 through BLKn, which is output from the neural network model 800. The victim block selection module 630 may inform the garbage collection manager module 620 that the memory block having a low garbage collection cost is a victim block.

The victim block selection module 630 may request the internal information of the memory system 100, which is used as the input data of the neural network model 800 in the GC mode, from the model input feature manager module 640. The model input feature manager module 640 may collect the internal information of the memory system 100. The model input feature manager module 640 may periodically collect internal information associated with previously performed (or "prior") data processing (e.g., writing, reading, erasing or modifying operation(s)) performed by the memory system 100.

Referring to FIG. 7A, the model input feature manager module 640 may collect the number of valid pages (which may be referred to as a valid page count (VPC)) for each of the first through n-th memory blocks BLK1 through BLKn of the memory device 120, an average read I/O operations per second (IOPS) indicating the average number of read IOPS of an SSD, an average write IOPS indicating the average number of write IOPS of the SSD, an average read IO size indicating an average data size of a read request of the SSD, an average write IO size indicating an average data size of a write request of the SSD, read throughput of the SSD, write throughput of the SSD, a free block count of the SSD, etc.

In addition, the model input feature manager module 640 may store a VPC for each of the first through n-th memory blocks BLK1 through BLKn at each of several past time steps (e.g., "t-2" and "t-1" and the present time step "t"), as further illustrated in FIG. 7B. In other words, the model input feature manager module 640 may store a VPC for each of the first through n-th memory blocks BLK1 through BLKn across a secession of intervals measured by a period "t".

The model input feature manager module 640 may provide the collected internal information of the memory system 100 as the input data of the neural network model 800 in response to the request of the victim block selection module 630.

Figure 8:
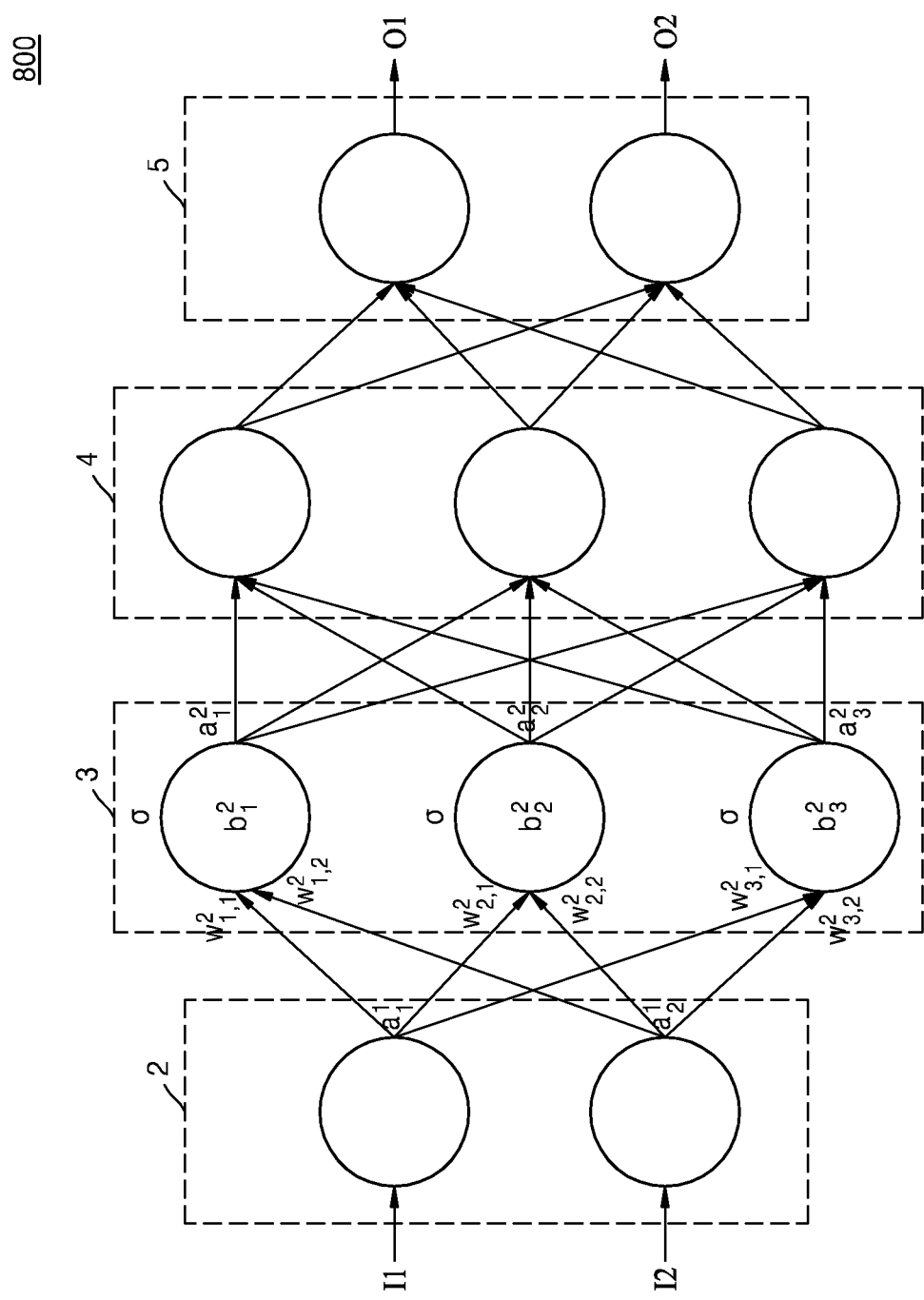
FIG. 8 is a diagram of an example of a neural network model in FIG. 6.

FIG. 8 is a conceptual diagram further illustrating in one example the operation of the neural network model 800 of FIG. 6. Referring to FIG. 8, the neural network model 800 may have a variety of architectures, including, for example, an input layer, one or more hidden layer(s), and an output layer. The neural network model 800 may perform an operation based on input data (e.g., I1 and I2) in order to generate output data (e.g., O1 and O2). The neural network model 800 may be trained by performing operations based on input data. While the neural network model 800 is being trained, the input data may be considered training data.

The neural network model 800 may be a deep neural network (DNN) or an n-layer neural network, each including at least two hidden layers. Thus, the neural network model 800 may be a DNN which includes an input layer 2, first and second hidden layers 3 and 4, and an output layer 5. The DNN may include a convolutional neural network (CNN), a recurrent neural network (RNN), a deep belief network, a restricted Boltzmann machine, etc. but is not limited thereto.

When the neural network model 800 has a DNN architecture, the neural network model 800 is capable of processing complex data sets since the neural network model 800 has many layers for obtaining valid information. Although the neural network model 800 has four layers, that is, the input layer 2, the first and second hidden layers 3 and 4, and the output layer 5 in FIG. 8, this is just an example and the neural network model 800 may include fewer or more layers. In addition, the neural network model 800 may include other various types of architecture of layers than shown in FIG. 8.

Each of the input layer 2, the first and second hidden layers 3 and 4, and the output layer 5 included in the neural network model 800 may include a plurality of neurons. A neuron may refer to an artificial node which is known as a processing element (PE), a processing unit, or a similar term. For example, the input layer 2 may include two neurons (or nodes) and each of the first and second hidden layers may include three neurons (or nodes). However, it is just an example and layers included in the neural network model 800 may include various numbers of neurons (or nodes).

Neurons included in different layers included in the neural network model 800 may be connected to each other and exchange data with each other. A neuron may receive data from other neurons, perform an operation on the data, and output an operation result to other neurons.

Input and output of each neuron (or node) may be referred to as an input activation and an output activation, respectively. In other words, activation may be a parameter which simultaneously corresponds to an output of a neuron and an input of neurons included in a succeeding layer. Each neuron may determine its own activation based on activations received from neurons included in a preceding layer and weights. A weight is a parameter used to calculate an output activation in a neuron and may be a value assigned to a connection relationship between neurons.

Each neuron may be processed by a neural processing unit (or a neural PE) which receives an input and provides an activation. Input and output of each neuron may be mapped to each other. For example, σ may be an activation function, $w_{j,k}^{i}$ may be a weight for connection from a k-th neuron in an (i−1)-th layer to a j-th neuron in an i-th layer, $b_j^i$ may be a bias value of the j-th neuron in the i-th layer, and $a_j^i$ may be an activation of the j-th neuron in the i-th layer and may be referred to as a post activation. The post activation $a_j^i$ may be calculated using Equation 1:

$$a_j^i = \sigma\left(\sum_k (w_{j,k}^i \times a_k^{i-1}) + b_j^i\right) \quad (1)$$

As shown in FIG. 8, a post activation of the first neuron in the first hidden layer 3 may be expressed as $a_1^2$. The post activation $a_1^2$ may have a value of $a_1^2 = \sigma(w_{1,1}^2 \times a_1^1 + w_{1,2}^2 \times a_2^1 + b_1^2)$ according to Equation 1. In other words, a post activation may be a value obtained by applying an activation function to the sum of activations received from a preceding layer. However, Equation 1 is just an example provided to explain an activation and a weight which are used to process data in a neural network, and embodiments are not limited thereto.

As described above, many data sets are exchanged between a plurality of neurons connected to each other and undergo many operations from layer to layer in the neural network model 800. The neural network model 800 may be trained through these operations, and weights and biases may be optimized based on the training.

Returning to the current embodiment illustrated in FIG. 8, the neural network model 800 may input a VPC for each of the first through n-th memory blocks BLK1 through BLKn at each of the time steps "t−2"; "t−1" and "t" to the input layer 2 as the input data I1 and I2. The neural network model 800 may then perform operations based on the VPC for each of the first through n-th memory blocks BLK1 through BLKn at each of the time steps, obtain training data through the operations, and provide output data corresponding to the training data. In this manner, the output data of the neural network model 800 may be used to indicate an estimated VPC for each of the first through n-th memory blocks BLK1 through BLKn at a future time step, e.g., "t+1".

The neural network model 800 may include parameters for each neuron, e.g., various kinds of data, such as weights and biases, based on which neural network operations are performed. With the repetitive training of the neural network model 800, parameters may be provided such that the neural network model 800 may more accurately compute an output, i.e., an estimated VPC of each of the first through n-th memory blocks BLK1 through BLKn, with respect to a given input, i.e., a VPC of each of the first through n-th memory blocks BLK1 through BLKn.

In an embodiment, parameters of the neural network model 800 may include parameters, e.g., the average read IOPS, average write IOPS, average read IO size, average write IO size, read throughput, write throughput, and free block count of the SSD, etc. which indicate data processing operations of the memory system 100.

For example, when the average read IOPS, average write IOPS, average read IO size, average write IO size, read throughput, or write throughput of the SSD increases, a VPC estimated by the neural network model 800 for each of the first through n-th memory blocks BLK1 through BLKn may tend to decrease. When the free block count of the SSD decreases, the VPC estimated by the neural network model 800 for each of the first through n-th memory blocks BLK1 through BLKn may also tend to decrease.

FIGS. 9A, 9B, 9C, 9D, 9E and 9F (collectively FIGS. 9A through 9F) are respective conceptual diagrams further illustrating the operation of the neural network model 800 of FIG. 8.

Figure 9A:
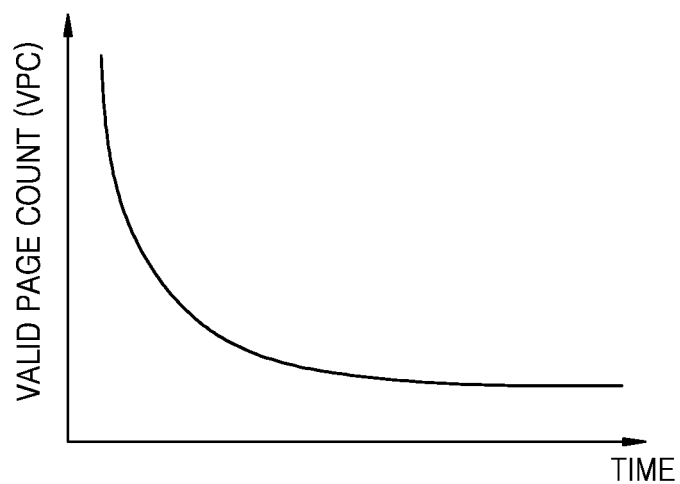
FIGS. 9A, 9B, 9C, 9D, 9E and 9F (collectively 9A through 9F) are respective diagrams further and conceptually illustrating the operation of the neural network model of FIG. 8.

Referring to FIG. 9A, the neural network model 800 may have a VPC of each of the first through n-th memory blocks BLK1 through BLKn at each of the past time steps "t−2" and "t−1" and the present time step "t" and a parameter of the neural network model 800, such as the average read IOPS, average write IOPS, average read IO size, average write IO size, read throughput, write throughput, or free block count of the SSD, as inputs, perform operations, obtain training data through the operations, and provide an estimated VPC of each of the first through n-th memory blocks BLK1 through BLKn at the future time step "t+1" as output data corresponding to the training data. The estimated VPC of each of the first through n-th memory blocks BLK1 through BLKn at the future time step "t+1" may tend to non-linearly decrease over time.

Figure 9B:
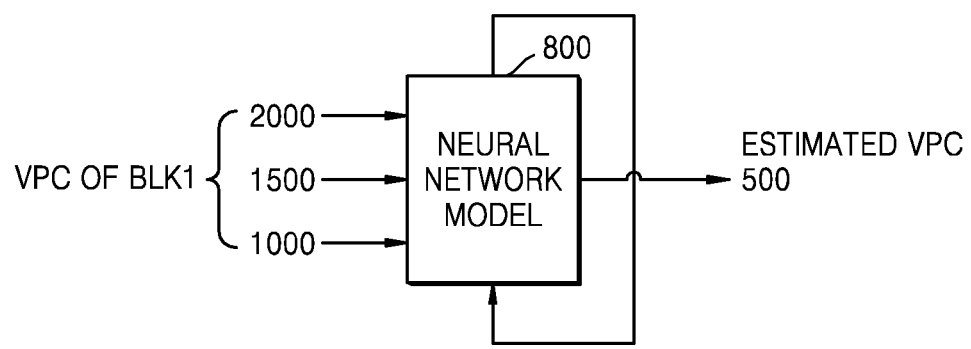

Referring to FIG. 9B, the neural network model 800 may provide an estimated VPC of the first memory block BLK1 among the first through n-th memory blocks BLK1 through BLKn. For example, it is assumed that VPCs of the first memory block BLK1 at the past time steps "t−2" and "t−1" and the present time step "t", respectively, are 2000, 1500, and 1000, as shown in FIG. 7B. The neural network model 800 may have VPCs of 2000, 1500, and 1000 as input data, perform operations based on the input data, i.e., 2000, 1500, and 1000, obtain training data through the operations, and provide 500 as output data corresponding to the training data. The output data of 500 indicates the estimated VPC of the first memory block BLK1 at the future time step "t+1".

Similarly to providing the estimated VPC with respect to the first memory block BLK1, the neural network model 800 may also provide an estimated VPC with respect to each of the other memory blocks BLK2 through BLKn.

Figure 9C:
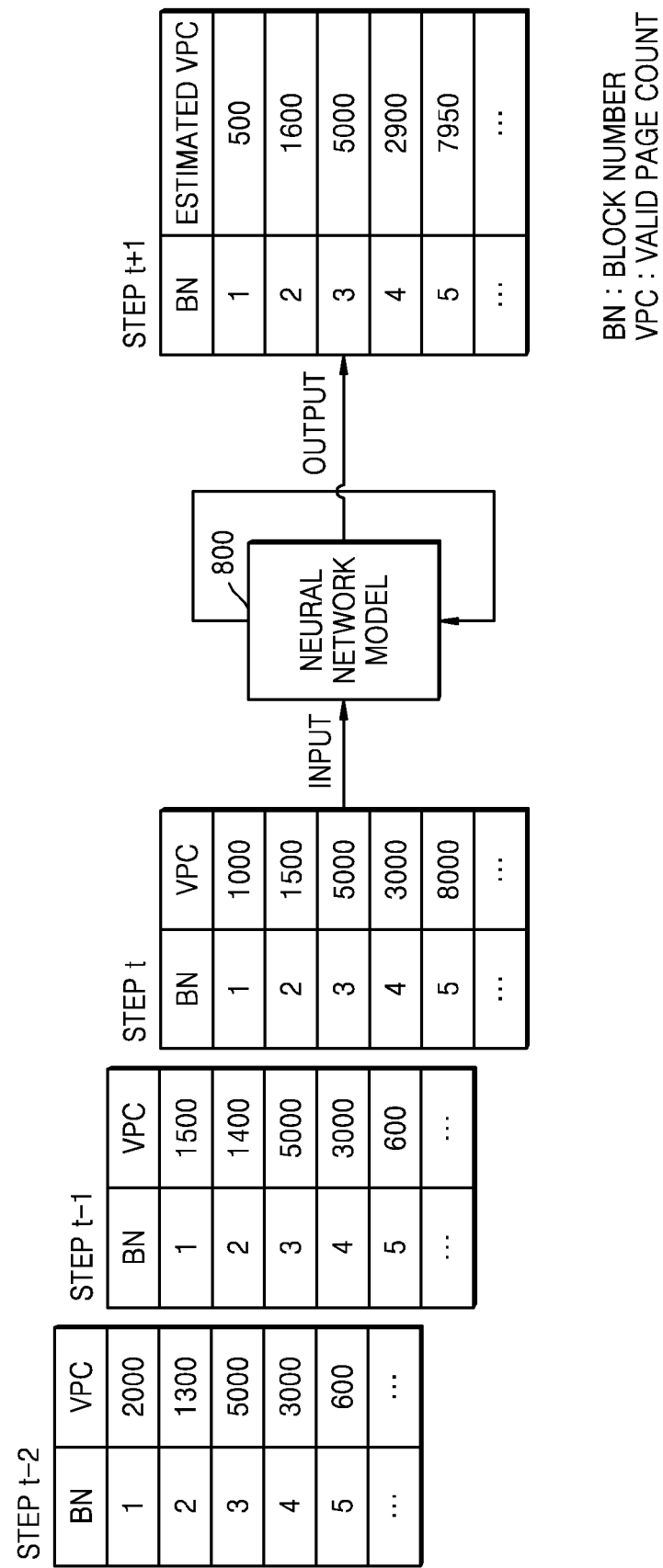

Referring to FIG. 9C, the neural network model 800 may have a VPC of each of the other memory blocks BLK2 through BLKn at each of the past time steps "t−2" and "t−1" as an input, perform operations, obtain training data through the operations, and provide an estimated VPC of each of the other memory blocks BLK2 through BLKn at the future time step "t+1" as output data corresponding to the training data.

For example, the neural network model 800 may have VPCs of 1300, 1400, and 1500 respectively at the past time steps "t−2" and "t−1" and the present time step "t" as input data, perform operations based on the input data, obtain training data through the operations, and provide 1600, i.e., an estimated VPC of the second memory block BLK2 at the future time step "t+1", as output data corresponding to the training data. The neural network model 800 may have VPCs of 5000, 5000, and 5000 respectively at the past time steps "t−2" and "t−1" and the present time step "t" as input data, perform operations based on the input data, obtain training data through the operations, and provide 5000, i.e., an estimated VPC of the third memory block BLK3 at the future time step "t+1", as output data corresponding to the training data.

The neural network model 800 may be repeatedly trained with respect to a VPC of each of the first through n-th memory blocks BLK1 through BLKn at the past time steps "t−2" and "t−1" and the present time step "t", and an estimated VPC at the future time step "t+1", which corresponds to training data of each of the first through n-th memory blocks BLK1 through BLKn, may show an increasing, a decreasing, or a maintaining tendency.

Figure 9D:
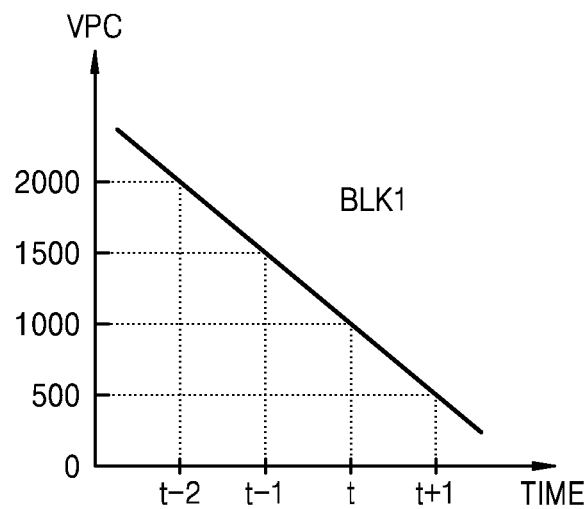

Referring to FIG. 9D, the neural network model 800 may predict that the VPC of the first memory block BLK1 tends to decrease from 2000 to 1500, 1000, and 500 as time passes from the past time steps "t−2" and "t−1" to the present time step "t" and the future time step "t+1".

Figure 9E:
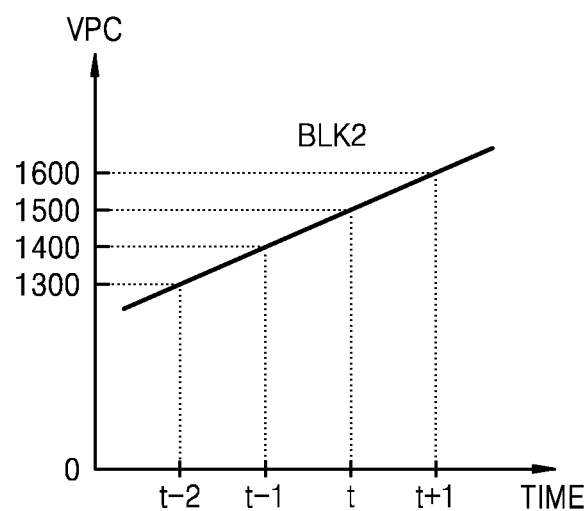

Referring to FIG. 9E, the neural network model 800 may predict that the VPC of the second memory block BLK3 tends to increase from 1300 to 1400, 1500, and 1600 as time passes from the past time steps "t−2" and "t−1" to the present time step "t" and the future time step "t+1".

Figure 9F:
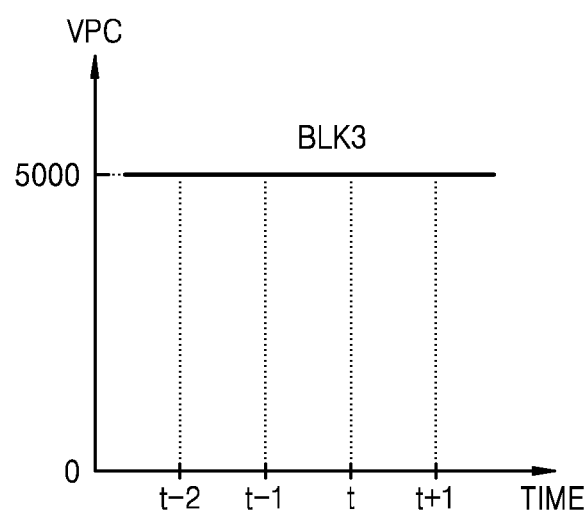

Referring to FIG. 9F, the neural network model 800 may predict that the VPC of the third memory block BLK3 tends to be maintained at 5000 as time passes from the past time steps "t−2" and "t−1" to the present time step "t" and the future time step "t+1".

The neural network model 800 may determine a garbage collection cost for each of the first through n-th memory blocks BLK1 through BLKn based on an estimated VPC of each of the first through n-th memory blocks BLK1 through BLKn and/or the decreasing, increasing, or maintaining tendency of the estimated VPC.

In an embodiment, the neural network model 800 may determine that a memory block having the lowest estimated VPC among the first through n-th memory blocks BLK1 through BLKn has a low (or lowest) garbage collection cost and may select the memory block as a victim block.

In an embodiment, the neural network model 800 may exclude a memory block having an estimated VPC having a decreasing tendency when selecting a victim block from the first through n-th memory blocks BLK1 through BLKn. Since the estimated VPC of the memory block having the decreasing tendency will further decrease over time, a garbage collection cost may be reduced by excluding the memory block from selecting a victim block.

In an embodiment, the neural network model 800 may select, as a victim block, a memory block having an estimated VPC having a maintaining tendency among the first through n-th memory blocks BLK1 through BLKn. The memory block having the estimated VPC having the maintaining tendency may have stored cold data which is not frequently accessed by a user. In this case, a garbage collection cost may be reduced when the memory block storing the cold data is selected as a victim block and made into a free block by undergoing garbage collection.

Figure 10:
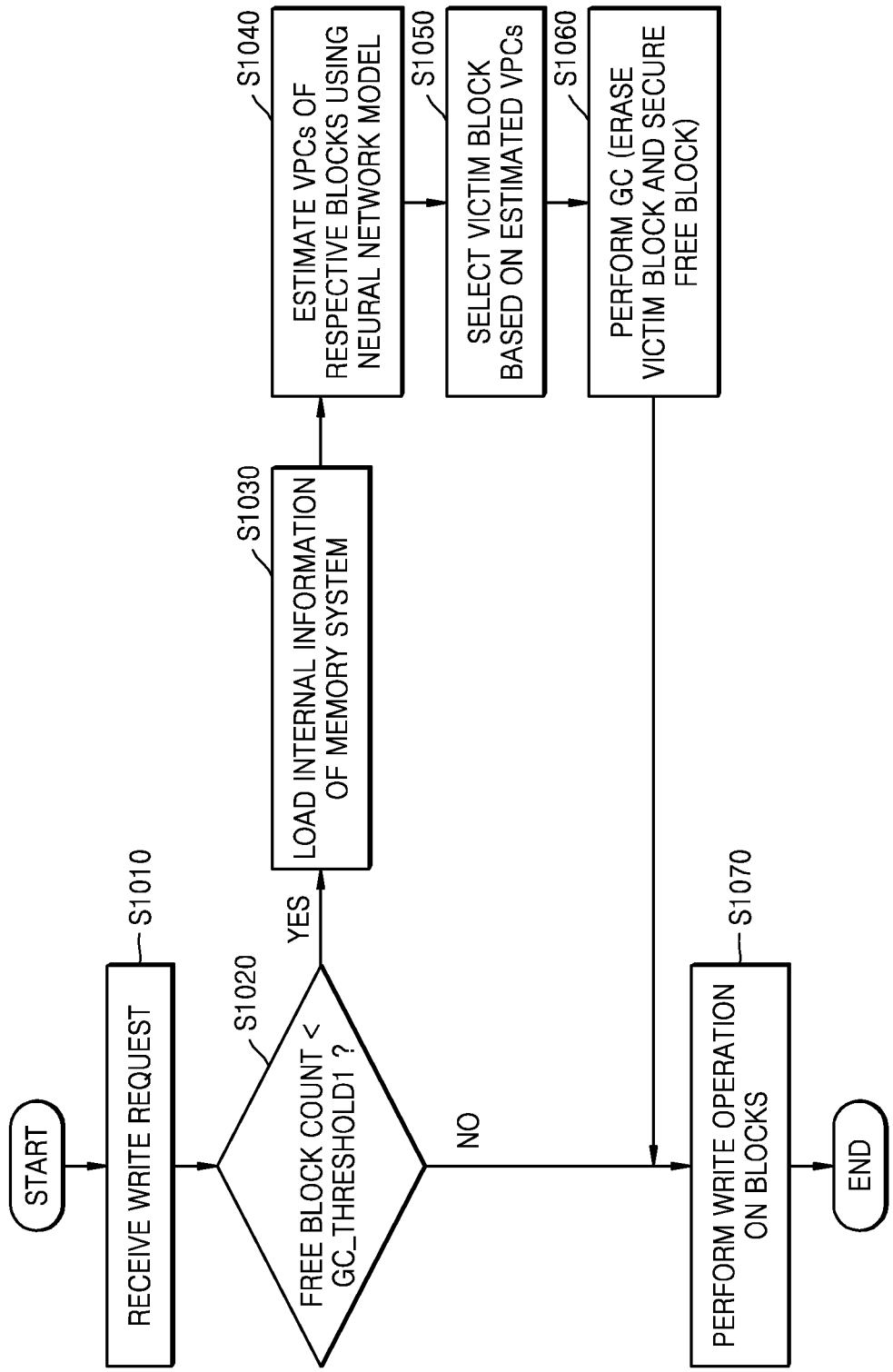
FIGS. 10 and 11 are flowcharts of a garbage collection operation according to an embodiment of the inventive concept.
Figure 11:
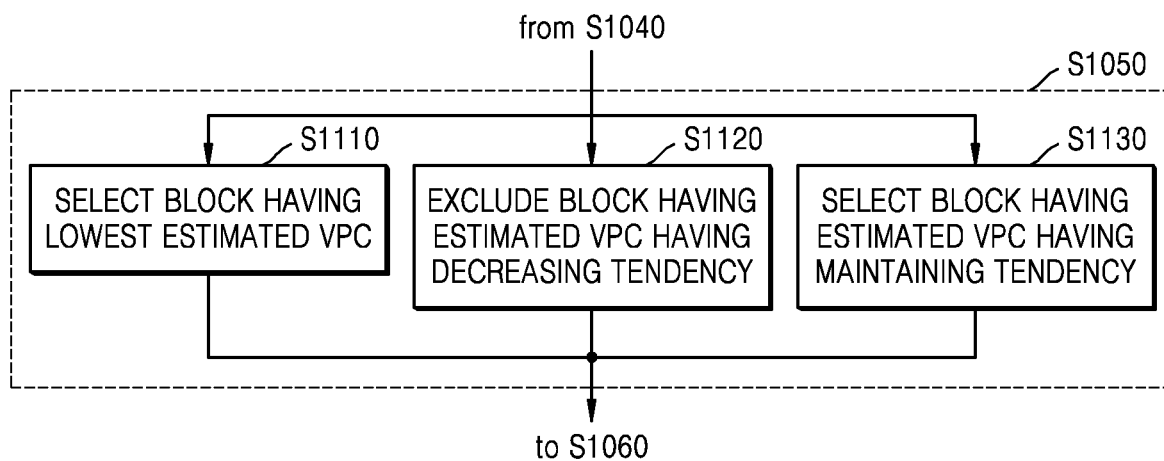

FIGS. 10 and 11 are respective flowcharts summarizing garbage collection operations that may be performed by memory system 100. Referring to FIG. 10 in association with FIGS. 1, 2 and 3, the memory controller 110 may receive a write request from the host in operation S1010.

The memory controller 110 may count the number of free blocks among the first through n-th memory blocks BLK1 through BLKn included in the memory cell array 122 of the memory device 120 in response to the write request of the host in operation S1020. The memory controller 110 may compare a count result, i.e., a free block count, with a first GC threshold value GC_THRESHOLD1 using the garbage collection trigger module 610 in operation S1020.

In an embodiment, operation S1020 may be performed periodically or when a certain condition such as a write request of the host is satisfied. The first GC threshold value GC_THRESHOLD1 may be changed or modified.

When the free block count is greater than the first GC threshold value GC_THRESHOLD1 in operation S1020, operation S1070 may be performed. The memory controller 110 may control a write operation to be performed on the first through n-th memory blocks BLK1 through BLKn of the memory device 120 with respect to the write request of the host in operation S1070.

When the free block count is less than the first GC threshold value GC_THRESHOLD1 in operation S1020, operation S1030 may be performed. The memory controller 110 may operate in a GC mode in operation S1030. In the GC mode, the memory controller 110 may load the internal information of the memory system 100 from the model input feature manager module 640 to the victim block selection module 630. The memory controller 110 may load the internal information of the memory system 100, such as a VPC of each of the first through n-th memory blocks BLK1 through BLKn and the average read IOPS, average write IOPS, average read IO size, average write IO size, read throughput, write throughput, and free block count of the SSD, to the victim block selection module 630.

The memory controller 110 may estimate a VPC of each of the first through n-th memory blocks BLK1 through BLKn using the neural network model 800, as shown in FIG. 9C, in operation S1040.

The memory controller 110 may select a memory block having a low garbage collection cost as a victim block based on the estimated VPC of each of the first through n-th memory blocks BLK1 through BLKn, which is output from the neural network model 800, in operation S1050. Operation S1050 may include operations S1110 through S1130 performed by the victim block selection module 630 in an embodiment further illustrated in FIG. 11.

The victim block selection module 630 may determine that a memory block having the lowest estimated VPC among the first through n-th memory blocks BLK1 through BLKn has the low garbage collection cost and may select the memory block as the victim block in operation S1110.

The victim block selection module 630 may exclude a memory block having an estimated VPC having a decreasing tendency when selecting the victim block from the first through n-th memory blocks BLK1 through BLKn in operation S1120.

The victim block selection module 630 may select, as the victim block, a memory block having an estimated VPC having a maintaining tendency among the first through n-th memory blocks BLK1 through BLKn in operation S1130.

The memory controller 110 may select the memory block having the low garbage collection cost as the victim block through operations S1110 through S1130 and may inform the garbage collection manager module 620 of the selected victim block in operation S1060.

The memory controller 110 may secure a single free block by copying data of valid pages from the victim block to a destination block and erasing the victim block using the garbage collection manager module 620 in operation S1060. Thereafter, the memory controller 110 may control the write operation to be performed on the first through n-th memory blocks BLK1 through BLKn of the memory device 120 with respect to the write request of the host in operation S1070.

Figure 12:
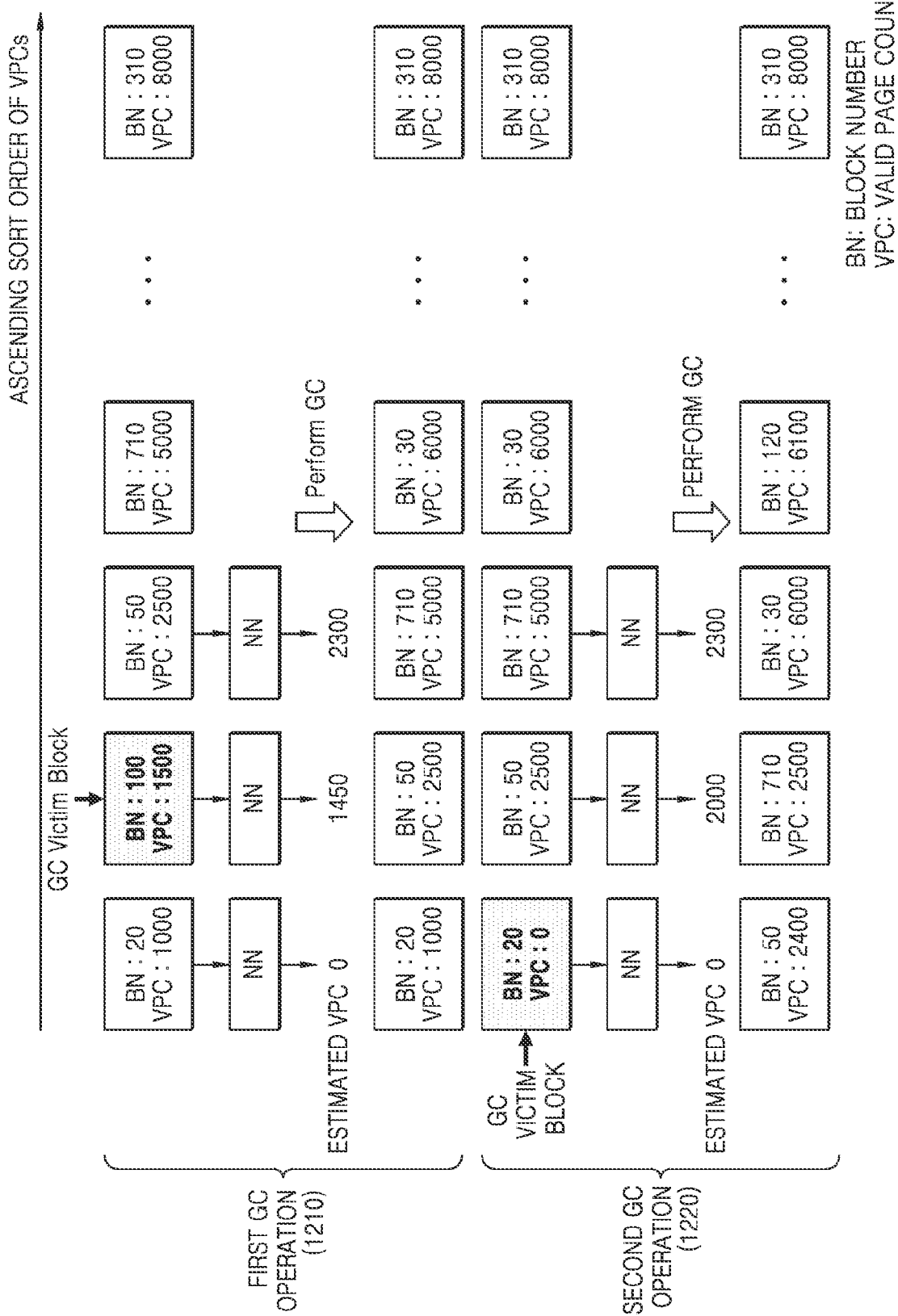
FIG. 12 is a diagram showing processes of carrying out garbage collection according to the garbage collection operation of FIGS. 10 and 11.

FIG. 12 is a conceptual diagram further illustrating certain aspects of the steps included in the garbage collection operation(s) of FIGS. 10 and 11. Referring to FIG. 12, in connection with operation S1020, the memory controller 110 may count the number of free blocks among the first through n-th memory blocks BLK1 through BLKn periodically or when the certain condition such as a write request of the host is satisfied and may operate in the GC mode when the free block count corresponding to the count result is less than the first GC threshold value GC_THRESHOLD1. Here, it is assumed that two (2) garbage collection operations are performed sequentially.

In a first garbage collection (GC) operation 1210, the memory controller 110 may sort VPCs of the respective first through n-th memory blocks BLK1 through BLKn in ascending order. The first through n-th memory blocks BLK1 through BLKn may be sorted in order from block number (BN) 20 having the lowest VPC to BN 100, BN 50, BN 710 . . . , and BN 310. The VPC of BN 20 may be 1000, the VPC of BN 100 may be 1500, and the VPC of BN 50 may be 2500.

In connection with operations S1030 and S1040, the memory controller 110 may estimate the VPC of each of the first through n-th memory blocks BLK1 through BLKn using the neural network model 800. As a result of a neural network operation NN, the estimated VPC of BN 20 may be 0, the estimated VPC of BN 100 may be 1450, and the estimated VPC of BN 50 may be 2300.

In connection with operation S1050, the memory controller 110 may exclude BN 20 having the estimated VPC of 0 from selecting the victim block (operation S1120) and select BN 100 having the lowest estimated VPC as the victim block (operation S1110), using the victim block selection module 630. In connection with operation S1060, the memory controller 110 may perform GC to secure a free block by copying data of 1500 valid pages of BN 100 selected as the victim block to the destination block and then erasing BN 100 using the garbage collection manager module 620.

After performing GC of BN 100 in the first GC operation 1210, the memory controller 110 may sort the first through n-th memory blocks BLK1 through BLKn except BN 100 in ascending order of VPCs starting from BN 20 having the lowest VPC to BN 50, BN 710, BN 30 . . . , and BN 310. At this time, the VPCs of respective BNs 20, 50, 710, and 30 may be 1000, 2500, 5000, and 6000, respectively.

In a second GC operation 1220, the memory controller 110 may count the number of free blocks among the first through n-th memory blocks BLK1 through BLKn periodically or when the certain condition such as a write request of the host is satisfied and may operate in the GC mode when the free block count is less than the first GC threshold value GC_THRESHOLD1 (operation S1020).

The second GC operation 1220 may be performed a certain time after the first GC operation 1210 is completed. Accordingly, after the first GC operation 1210, the VPCs of respective BNs 20, 50, 710, and 30 sorted as having the lowest VPCs may be changed from 1000, 2500, 5000, and 6000 to 0, 2500, 5000, and 6000, respectively. It may be seen that the VPC of BN 20 is changed from 1000 to 0, which coincides with the estimated VPC of 0 obtained for BN 20 as the result of the neural network operation NN performed in the neural network model 800 in the first GC operation 1210.

In connection with operations S1030 and S1040, the memory controller 110 may estimate VPCs of respective BNs 20, 50, 710, and 30, which are sorted as having the lowest VPCs, using the neural network model 800. As a result of the neural network operation NN, the estimated VPC of BN 20 may be 0, the estimated VPC of BN 50 may be 2000, and the estimated VPC of BN 700 may be 2300.

In connection with operation S1050, the memory controller 110 may select BN 20 having the VPC of 0 and the estimated VPC of 0 as the victim block (operation S1110) using the victim block selection module 630. In other words, since BN 20 selected as the victim block has no valid page, BN 20 may be erased without an operation of copying data of valid pages to a destination block, and therefore, BN 20 has a low GC cost. In connection with operation S1060, the memory controller 110 may perform GC to secure a free block by erasing BN 20 selected as the victim block using the garbage collection manager module 620.

After performing GC of BN 20 in the second GC operation 1220, the memory controller 110 may sort the first through n-th memory blocks BLK1 through BLKn except BN 100 and BN 20 in ascending order of VPCs starting from BN 50 having the lowest VPC to BN 710, BN 30, BN 120 . . . , and BN 310.

The operation of copying the data of 1500 valid pages from BN 100 selected as the victim block to the destination block is performed in the first GC operation 1210, but no copying operation is performed in the second GC operation 1220. Accordingly, a total number of valid pages undergoing the copying operation in both the first and second GC operations 1210 and 1220 is 1500.

Figure 13:
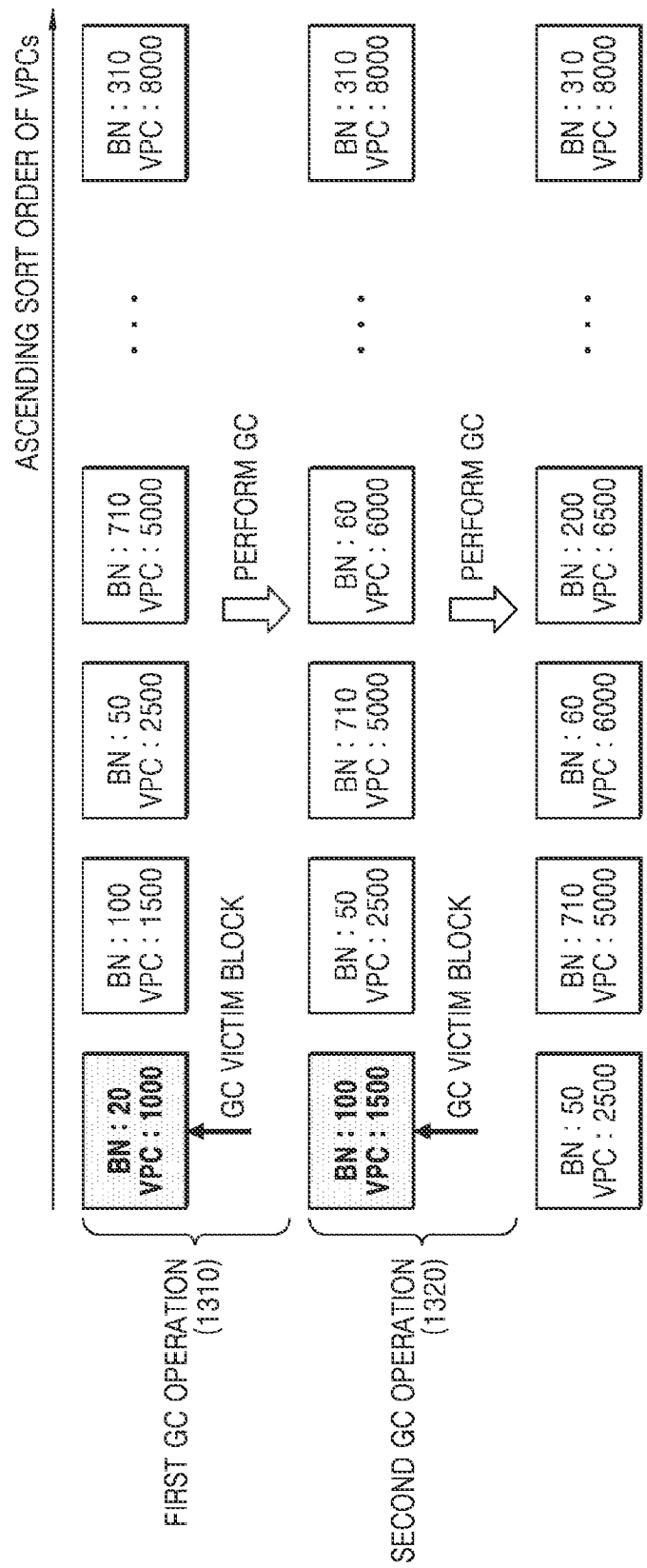
FIG. 13 illustrates a comparative example against a garbage collection operation of FIG. 12.

FIG. 13 illustrates a comparative example that may be considered in relation to the GC operation of FIG. 12. Here, it should be noted that a GC operation may be performed according to varying policies, where FIG. 13 shows an example of performing GC using a traditional and simple greedy policy. According to the greedy policy, a memory block that has the lowest VPC at the time of triggering GC is selected as a victim block and GC is performed on the victim block. FIG. 13 shows a case that assumes only two GC operations are sequentially performed, similar to the GC operation described with reference to FIG. 12.

Thus, assuming a similar environment to that in which the first GC operation 1210 is triggered in FIG. 12, memory blocks may be sorted in ascending order of VPCs starting from BN 20 having the lowest VPC to BN 100, BN 50, BN 710, . . . , and BN 310. The VPC of BN 20 may be 1000, the VPC of BN 100 may be 1500, and the VPC of BN 50 may be 2500.

In a first GC operation 1310 of the greedy policy, BN 20 having the lowest VPC may be selected as a victim block. GC for securing a free block may be performed by copying data of 1000 valid pages of BN 20 selected as the victim block to a destination block and erasing BN 20. Thereafter, the remaining memory blocks may be sorted in ascending order starting from BN 100 having the lowest VPC to BN 50, BN 710 . . . , and BN 310.

In a second GC operation 1320 of the greedy policy, BN 100 having the lowest VPC may be selected as a victim block. GC for securing a free block may be performed by copying data of 1500 valid pages of BN 100 selected as the victim block to a destination block and erasing BN 100.

In the first GC operation 1310 of the greedy policy, an operation of copying data of 1000 valid pages from BN 20 selected as the victim block to the destination block is performed. In the second GC operation 1320 of the greedy policy, an operation of copying data of 1500 valid pages from BN 100 selected as the victim block to the destination block is performed. Accordingly, a total of valid pages undergoing the copying operation in both the first and second GC operations 1310 and 1320 of the greedy policy is 2500.

TABLE 1

|  | FIG. 12 | FIG. 13 |
|---|---|---|
| The number of valid pages copied in GC (i.e., GC cost) | 1500 | 2500 |

As may be seen from Table 1, while the number of valid pages copied in the GC operation (FIG. 12) performed based on estimated VPCs according to embodiments is 1500, the number of valid pages copied in the GC operation (FIG. 13) of the greedy policy is 2500. The GC operation performed based on estimated VPCs according to embodiments may reduce GC cost by about 40% as compared to the GC operation of the greedy policy.

Figure 14:
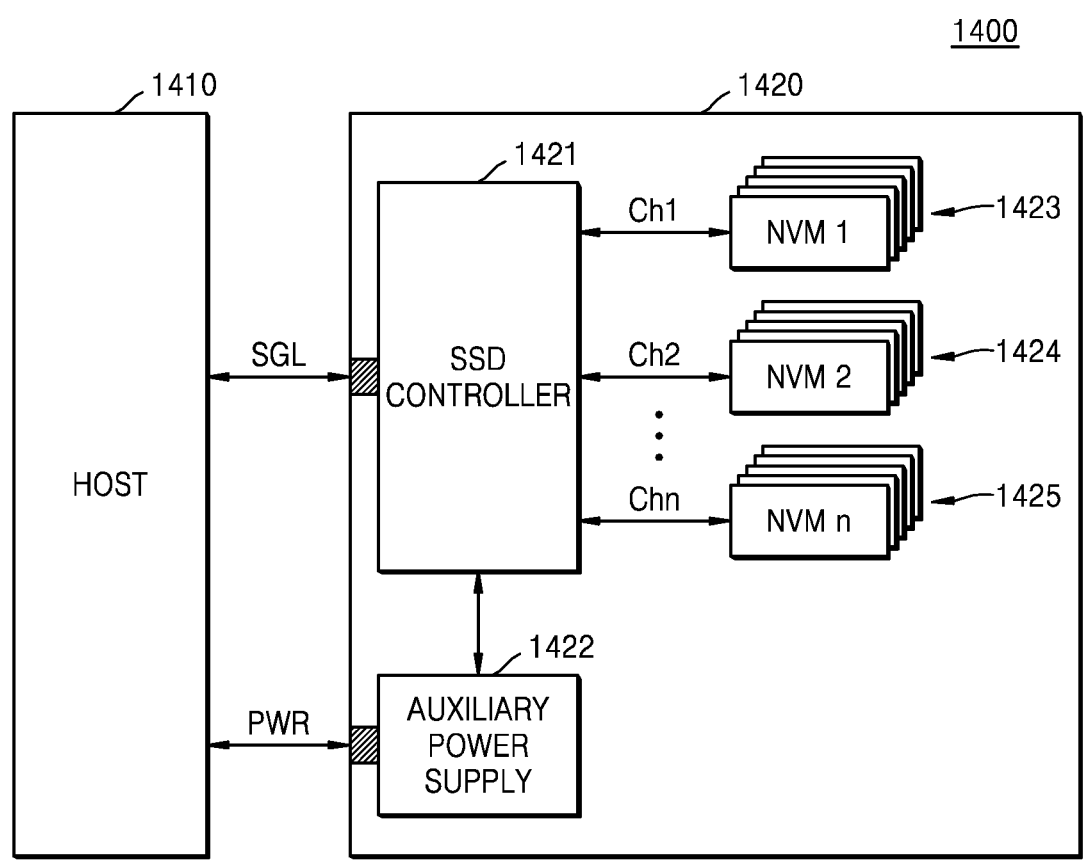
FIG. 14 is a block diagram of an example in which a garbage collection operation carried out based on the estimated number of valid pages is applied to a solid state drive (SSD) system, according to an embodiment of the inventive concept.

FIG. 14 is a block diagram illustrating one type of memory system 100 that may benefit from a garbage collection operation like the ones described above. Here, an estimated VPC approach may be applied to an SSD system 1400. Referring to FIG. 14, the SSD system 1400 may include a host 1410 and an SSD 1420. The SSD 1420 exchanges signals with the host 1410 via a signal connector and receives power via a power connector. The SSD 1420 may include an SSD controller 1421, an auxiliary power supply 1422, and a plurality of non-volatile memory devices 1423, 1424, and 1425.

The SSD controller 1421 may control garbage collection of the non-volatile memory devices 1423, 1424, and 1425 using the embodiments illustrated in FIGS. 1 through 12. The SSD controller 1421 may estimate a VPC of each of memory blocks included in each of the non-volatile memory devices 1423, 1424, and 1425 using a neural network model. The neural network model is trained based on the VPCs of the memory blocks, which store data in each of the non-volatile memory devices 1423, 1424, and 1425. The SSD controller 1421 may select a victim block that undergoes garbage collection from the memory blocks based on the estimated VPCs of the respective memory blocks in each of the non-volatile memory devices 1423, 1424, and 1425.

The SSD controller 1421 may select, as a victim block, a memory block having the lowest estimated VPC among the memory blocks in each of the non-volatile memory devices 1423, 1424, and 1425. The SSD controller 1421 may exclude a memory block having the estimated VPC having a decreasing tendency among the memory blocks in each of the non-volatile memory devices 1423, 1424, and 1425 from selecting a victim block. The SSD controller 1421 may select, as a victim block, a memory block having the estimated VPC having a maintaining tendency among the memory blocks in each of the non-volatile memory devices 1423, 1424, and 1425.

The SSD controller 1421 may control garbage collection to be performed in each of the non-volatile memory devices 1423, 1424, and 1425 such that data of valid pages is copied from the victim block to a destination block and the victim block is erased.

While the inventive concept has been particularly shown and described with reference to embodiments thereof, it will be understood that various changes in form and details may be made therein without departing from the spirit and scope of the following claims.

What is claimed is:

1. A method of operating a storage device including a memory controller and a non-volatile memory device storing data in memory blocks, the method comprising:
estimating a valid page count (VPC) for each of memory blocks using a neural network model trained based on the VPC for each of the memory blocks;
selecting a victim block from the memory blocks based on an estimated VPC for each of the memory blocks; and
performing garbage collection on the victim block.

2. The method of claim 1, wherein the estimating of the VPC for each of the memory blocks comprises performing an operation in the neural network model based on the VPC for each of the memory blocks at each of at least one past time step and a present time step.

3. The method of claim 2, further comprising:
obtaining training data by performing the operation using the neural network model; and
providing the estimated VPC for each of the memory blocks at a future time step as output data corresponding to the training data.

4. The method of claim 3, further comprising:
collecting internal information associated with prior data processing operations by the storage device; and
providing the internal information to the neural network model.

5. The method of claim 4, wherein the internal information includes at least one of an average number of read input/output (I/O) operations per second, an average number of write I/O operations per second, an average data size of a read request, an average data size of a write request, read throughput, write throughput, and a free block count.

6. The method of claim 1, wherein the selecting of the victim block from the memory blocks comprises selecting, as the victim block, a memory block having a lowest estimated VPC among the memory blocks.

7. The method of claim 1, wherein the selecting of the victim block from the memory blocks comprises excluding a memory block having the estimated VPC having a decreasing tendency from among the memory blocks.

8. The method of claim 1, wherein the selecting of the victim block from the memory blocks comprises selecting, as the victim block, a memory block having an estimated VPC with a maintaining tendency among the memory blocks.

9. The method of claim 1, further comprising:
determining whether a free block count is less than a threshold value, the free block count indicating a number of free blocks among the memory blocks.

10. The method of claim 9, further comprising:
obtaining the free block count by counting the free blocks among the memory blocks when a write request is received.

11. The method of claim 9, further comprising:
obtaining the free block count by periodically counting the free blocks among the memory blocks.

12. The method of claim 1, wherein the performing of the garbage collection on the victim block comprises:
copying data of valid pages from the victim block to a destination block; and
erasing the victim block.

13. A storage device comprising:
a non-volatile memory device including memory blocks storing data; and
a memory controller configured to estimate a valid page count (VPC) for each of the memory blocks using a neural network model and to select a victim block from the memory blocks based on an estimated VPC for each of the memory blocks,
wherein the neural network model is trained based on the VPC for each of the memory blocks.

14. The storage device of claim 13, wherein the memory controller is further configured to perform the garbage collection on the victim block by copying data of valid pages from the victim block to a destination block and erasing the victim block.

15. The storage device of claim 13, wherein the memory controller is further configured to count free blocks among the memory blocks and to perform the garbage collection when a free block count is less than a threshold value, and
the memory controller counts the free blocks periodically or upon receiving a write request.

16. The storage device of claim 13, wherein the memory controller is further configured to provide the VPC as input data of the neural network model for each of the memory blocks at each one of at least one past time step and a present time step, and to obtain the estimated VPC for each of the memory blocks at a future time step as output data of the neural network model.

17. The storage device of claim 13, wherein the memory controller selects, as the victim block, a memory block having a lowest estimated VPC among the memory blocks.

18. A non-volatile memory device comprising:
a memory cell array including memory blocks storing data; and
a control logic block configured to control garbage collection performed on a victim block, the victim block being selected from the memory blocks based on estimated valid page counts provided from a neural network model trained based on valid page counts of the memory blocks.

19. The non-volatile memory device of claim 18, wherein, when a memory block having a lowest estimated valid page count among the memory blocks is selected as the victim block, the control logic block performs the garbage collection by copying data of valid pages from the victim block to a destination block and erasing the victim block.

20. The non-volatile memory device of claim 19, wherein, when a memory block having an estimated valid page count having a maintaining tendency among the memory blocks is selected as the victim block, the control logic block performs the garbage collection by copying data of valid pages from the victim block to a destination block and erasing the victim block.

* * * * *